(12) United States Patent
Roethel

(10) Patent No.: US 6,231,104 B1
(45) Date of Patent: May 15, 2001

(54) REMOVABLE SHIELD

(76) Inventor: Rhonda Roethel, P.O. Box 982, Ogdensburg, NY (US) 13669

( * ) Notice: Subject to any disclaimer, the term of this patent is extended or adjusted under 35 U.S.C. 154(b) by 0 days.

(21) Appl. No.: 09/182,528

(22) Filed: Oct. 30, 1998

(51) Int. Cl.[7] ............................................... B62J 17/00
(52) U.S. Cl. ......................... 296/78.1; 296/77.1; 296/81; 296/82
(58) Field of Search ..................... 296/78.1, 77.1, 296/81, 82

(56) References Cited

U.S. PATENT DOCUMENTS

| | | | |
|---|---|---|---|
| 557,488 | * | 3/1896 | Cherry ................................ 296/78.1 |
| 600,010 | * | 3/1898 | Miller ................................ 296/78.1 |
| 651,660 | | 6/1900 | Green . |
| 1,169,888 | | 2/1916 | Tulloch . |
| 1,360,945 | * | 11/1920 | Harley ................................ 296/78.1 |
| 1,532,008 | * | 3/1925 | Walford ............................. 296/78.1 |
| 1,729,086 | * | 9/1929 | Premont ............................. 296/78.1 |
| 2,237,594 | * | 4/1941 | Dunlap ............................... 296/78.1 |
| 2,396,493 | * | 3/1946 | Comiskey .......................... 296/78.1 |
| 3,690,721 | * | 9/1972 | Herbert .............................. 296/78.1 |
| 3,829,152 | * | 8/1974 | Hobbs ................................ 296/78.1 |
| 3,866,242 | * | 2/1975 | Slagel ................................ 296/78.1 |
| 3,891,265 | * | 6/1975 | Blackburn ......................... 296/78.1 |
| 4,066,291 | * | 1/1978 | Hickman ............................ 296/78.1 |
| 4,082,345 | * | 4/1978 | Willey ............................... 296/78.1 |
| 4,655,497 | * | 4/1987 | Mallett .............................. 296/78.1 |
| 5,052,738 | | 10/1991 | Li . |
| 5,125,712 | * | 6/1992 | Stamoutsos ....................... 296/77.1 |
| 5,267,767 | * | 12/1993 | Farrow .............................. 296/78.1 |
| 5,562,139 | * | 10/1996 | Cseri ................................. 296/78.1 |
| 5,662,372 | | 9/1997 | Lubkeman . |

FOREIGN PATENT DOCUMENTS

| | | | | |
|---|---|---|---|---|
| 221493 | * | 5/1942 | (CH) | ................................. 296/78.1 |
| 560004 | * | 12/1922 | (FR) | ................................. 296/78.1 |
| 870639 | * | 11/1940 | (FR) | ................................. 296/778.1 |
| 1171618 | * | 3/1957 | (FR) | ................................. 296/78.1 |
| 17888 | * | of 1897 | (GB) | . |
| 12658 | * | 2/1898 | (GB) | ................................. 296/78.1 |
| 531137 | * | 12/1940 | (GB) | ................................. 296/78.1 |
| 346625 | * | 2/1937 | (IT) | ................................. 296/78.1 |
| 480581 | * | 9/1951 | (IT) | ................................. 296/78.1 |
| 528750 | * | 2/1955 | (IT) | ................................. 296/78.1 |

* cited by examiner

Primary Examiner—Joseph D. Pape
Assistant Examiner—Kiran B. Patel
(74) Attorney, Agent, or Firm—Evenson, McKeown, Edwards & Lenahan, P.L.L.C.

(57) ABSTRACT

A removable shield for deflecting wind and projectile objects from the front of a vehicle such as a motorcycle or bicycle. The shield comprises a flexible material that is sized to cover a portion of the front of the motorcycle or bicycle and is located from between the handlebar down to the front fender, or front forks. The shield is attached by elastomeric cords and hooks, or other suitable fastening device to the handlebars and front fender or front forks.

11 Claims, 3 Drawing Sheets

REMOVABLE SHIELD

BACKGROUND AND SUMMARY OF THE INVENTION

The present invention relates to shields for motorcycles, bicycles and the like, and more specifically to removable shields which deflect wind, water and objects such as stones and bugs away from the front of a motorcycle or bicycle.

The comfort and safety of the operator of a motorcycle or bicycle may be compromised by such factors as wind, water and projectile objects such as stones, bugs, and flying debris which collide with the motorcycle or the operator. Various devices are known which attempt to protect the operator and the motorcycle. Such devices include fixed, rigid ferrings or cowls as are well know within the art. However, these devices remain fixed to the bike and are costly.

Other devices are known within the art that encase the operator and/or the motorcycle to provide a protective barrier against wind and precipitation. Such devices are flexible, however, they are bulky for storage. An example of a device that encases the operator during use is provided for in U.S. Pat. No. 5,052,738 (Li; Oct. 1, 1991), which discloses a canvas cover for use in protecting a motorcycle and its operator from inclement weather conditions and wind. The cover may be draped over the operator and the motorcycle, and has openings through which the head and hands of the operator extend. The cover may also be used to protect the bike for storage purposes when not in use. Similarly, U.S. Pat. No. 5,662,372 (Gilbert; Oct. 17, 1995) teaches a protective cover structure for a motorcycle which drapes over the motorcycle and the operator. Such covers which encase the operator and the vehicle tend to be cumbersome, and may also be unsafe if the movement of the operator is restricted. Furthermore, these latter devices limit the ease of mounting or dismounting the vehicle.

U.S. Pat. No. 651,660 (Green; Jun. 12, 1900) discloses an apron for use on a bicycle. The device, which is ferring-like in that it is comprised of a rigid material, is suspended from the bicycle handle bars via straps or hooks, and extends down from the handle bars for fastening around a lower crossbar of the bicycle frame. The device is designed to enclose the front and side portions of a bicycle, and optionally the handle bars to provide protection for the upper legs of the operator against rain, mud and other wet weather conditions. However, this apron does not provide protection to the lower legs. Furthermore, this apron does not provide for compact storage within a pocket or saddle bag etc., when not in use.

U.S. Pat. No. 1,169,888 (Tulloch; Jul. 15, 1914) teaches a shield for use with bicycles or motorcycles to protect the operator from inclement weather. The device is suspended over the handle bars by means of a support framework to cover the operator's hands and extends downwardly to cover the operator's lower extremities. Clips are used to secure the device in place on the support framework over the front of the cycle. When not in use, the device may be rolled up and stored on the support framework above the handle bars. However, the shield is only loosely attached to the bike frame and would flap excessively in wind thereby providing reduced protection to the rider, and possibly be unsafe. Furthermore, this shield requires partial removal in order to permit the rider to mount or dismount the vehicle.

Although the prior art covers and shields may protect the motorcycle, or bicycle, and operator from wind, precipitation or projectile objects, each produces a dramatic effect on the aesthetic appeal of the vehicle. Additionally, some of the prior art devices are potentially unsafe since without fitting tightly to the vehicle, there is a possibility that the cover will flap in the wind and become entangled in the moving parts of the bike. Other covers, such as those designed to encase the operator, may be unsafe in that the movement of the operator is restricted. Furthermore many of these devices are not portable and compact, and easily stowed when not in use. Many of the prior art devices are also costly and several are permanently or semi-permanently attached to the frame of the vehicle. There is no disclosure within the prior art of a flexible, compact shield that is easily removed and that affords protection to the legs, mid region of the body and hands of a rider, and that does not interfere with the mounting or dismounting a bike.

SUMMARY OF THE INVENTION

The present invention relates to shields for motorcycles, bicycles and the like, and more specifically to removable shields which deflect wind, water, debris and objects such as stones and bugs away from the front of a motorcycle or bicycle.

According to the present invention there is provided a removable shield for deflecting wind and projectile objects from the front of a vehicle, said shield comprising a flexible material sized to cover a portion of the front of said vehicle between handlebar and front fender or front fork; and attachment means extending from said flexible material for securing said shield to the front of said vehicle.

This invention is also directed to a removable shield as defined above, wherein said attachment means secure said shield to said handlebar and to said front fender of said vehicle. Furthermore, said attachment means may as required secure said shield to said handlebar and to said front fork of said vehicle. This invention also includes the removable shield as defined above, wherein said attachment means secure said shield material to the rear view mirror stems of said handlebar.

The present invention also relates to the removable shield as defined above, wherein the attachment means comprise at least one elastomeric cord adapted for attachment to said handlebar, said front fender, or front fork. Furthermore, this invention encompasses the removable shield as defined above, additionally comprising anchoring straps extending from said flexible material to attach to the front of said vehicle in at least one attachment point located between said handlebar and front fender, or front fork. The anchoring straps may comprise hook and loop fasteners, and may be positioned to attach said flexible material to the front turning signal stems of said vehicle.

This invention also relates to the removable shield as defined above, wherein the attachment means further comprises at least one clamp means adapted for attachment to said handlebar, said front fender, front fork, or other item on the front of said vehicle, or a combination thereof; said clamp means adapted for attachment to said elastomeric cord. Furthermore, said clamp means allows reversible affixation of said elastomeric cord and the front of said vehicle so that the flexible material will be maintained in a position located between said handlebar and front fender or front fork.

This invention also includes the removable shield as defined above, wherein the flexible material is nylon, plastic, vinyl or leather.

This invention is also directed to the removable shield as defined above, wherein the vehicle is a motorcycle, and further provides for an aperture in said shield for a headlight, furthermore, said aperture may comprise an elasticized perimeter adapted to fit around said headlight, and the elasticized perimeter may additionally comprises a hook and loop fastener closure for adjusting the fit of said aperture around said headlight.

This invention also provides for the removable shield as defined above, wherein the vehicle is a bicycle.

The removable shield of the present invention has the advantage that it may be securely and closely fastened to the vehicle when in use, thus decreasing the likelihood of entanglement with moving parts of the vehicle. A further advantage resides in that the shield of the present invention is flexible and removable from the vehicle, and thus is easily and compactly stowed in a saddlebag or elsewhere upon removal. Additionally, the securing of the shield to the vehicle has minimal aesthetic impact on the appearance of the vehicle, and when attached, the shield of the present invention does not interfere with the rider's access to mounting or dismounting the vehicle. The removable shield may also be used in conjunction with a windshield.

BRIEF DESCRIPTION OF THE DRAWINGS

These and other features of the invention will become more apparent from the following description in which reference is made to the appended drawings wherein:

FIG. 2 shows a view of an embodiment of the removable shield of the present invention indicating the positioning of anchoring straps, grommets and the like.

DESCRIPTION OF PREFERRED EMBODIMENTS

The present invention relates to a removable shield for a vehicle such as a motorcycle, a bicycle and the like in order to deflect wind, water, debris and objects such as stones and bugs away from the rider.

When riding a motorcycle at highway speeds for extended periods of time, the operator may become uncomfortable and fatigued from cold temperatures and excessive wind. Cold temperature and wind may also provide discomfort to a rider of a bicycle as well. The removable shield as described herein provides comfort to the operator by deflecting wind away from the operator. The removable shield also enhances the safety of the operator by reducing the likelihood of the operator being hit by stones, bugs, and other air-borne debris when riding the vehicle. The removable shield deflects such projectile objects, including water, away from the operator. The front of the motorcycle or bicycle is also protected from damage to its finish from such air-borne projectiles.

Figure 1:
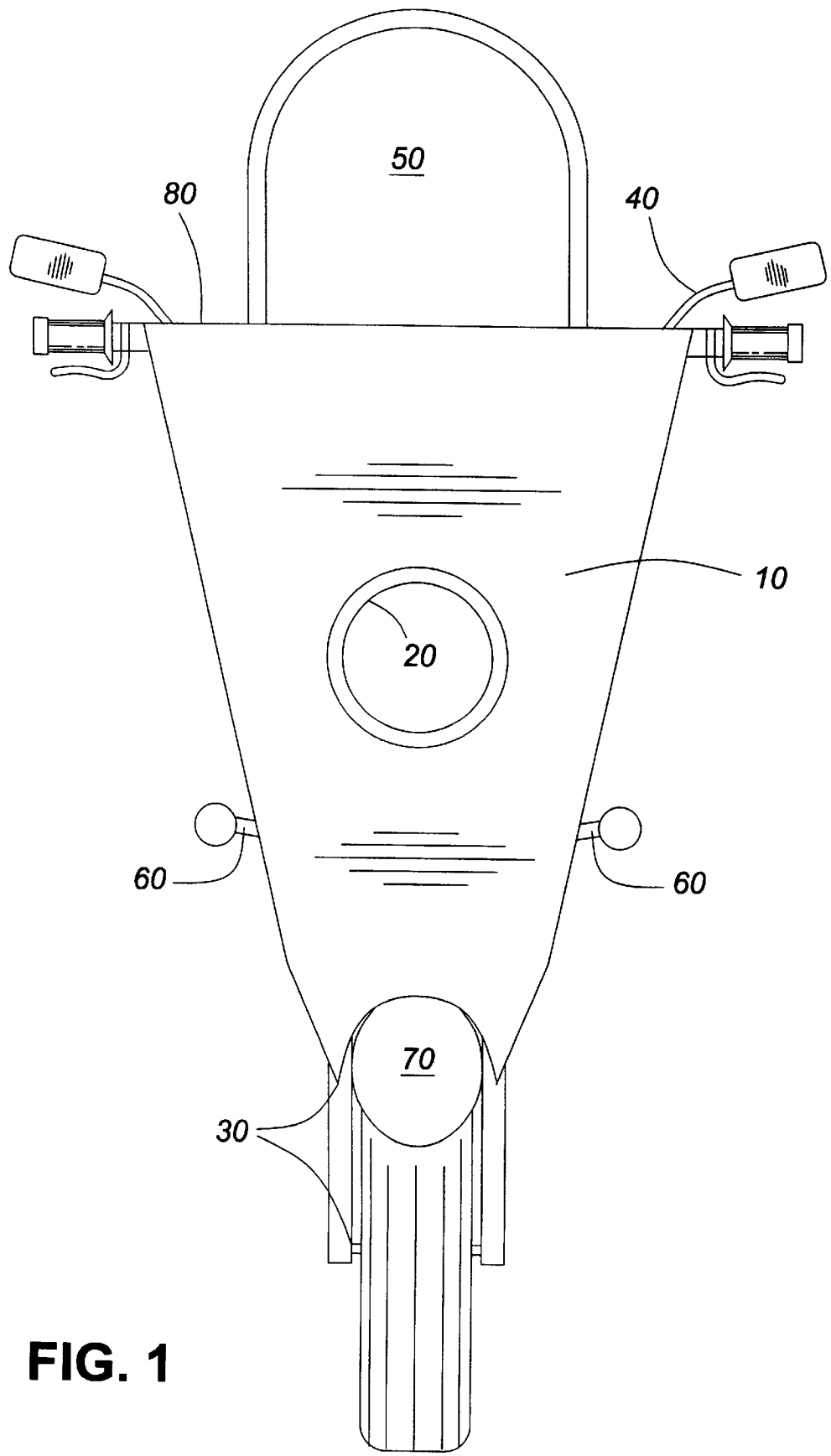
FIG. 1 shows a perspective view of a preferred embodiment of the removable shield deployed on a motorcycle.
Figure 2:
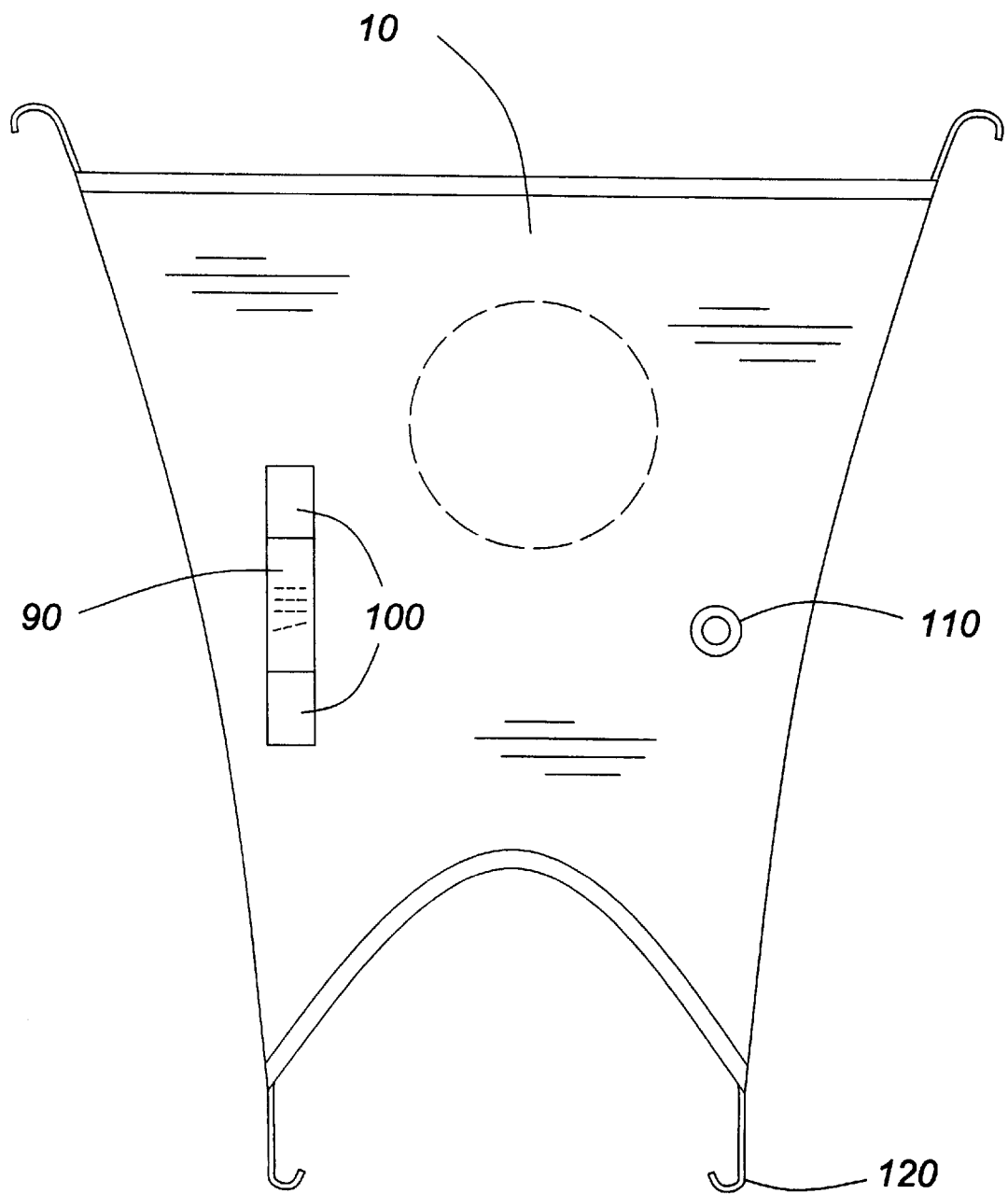
Figure 3:
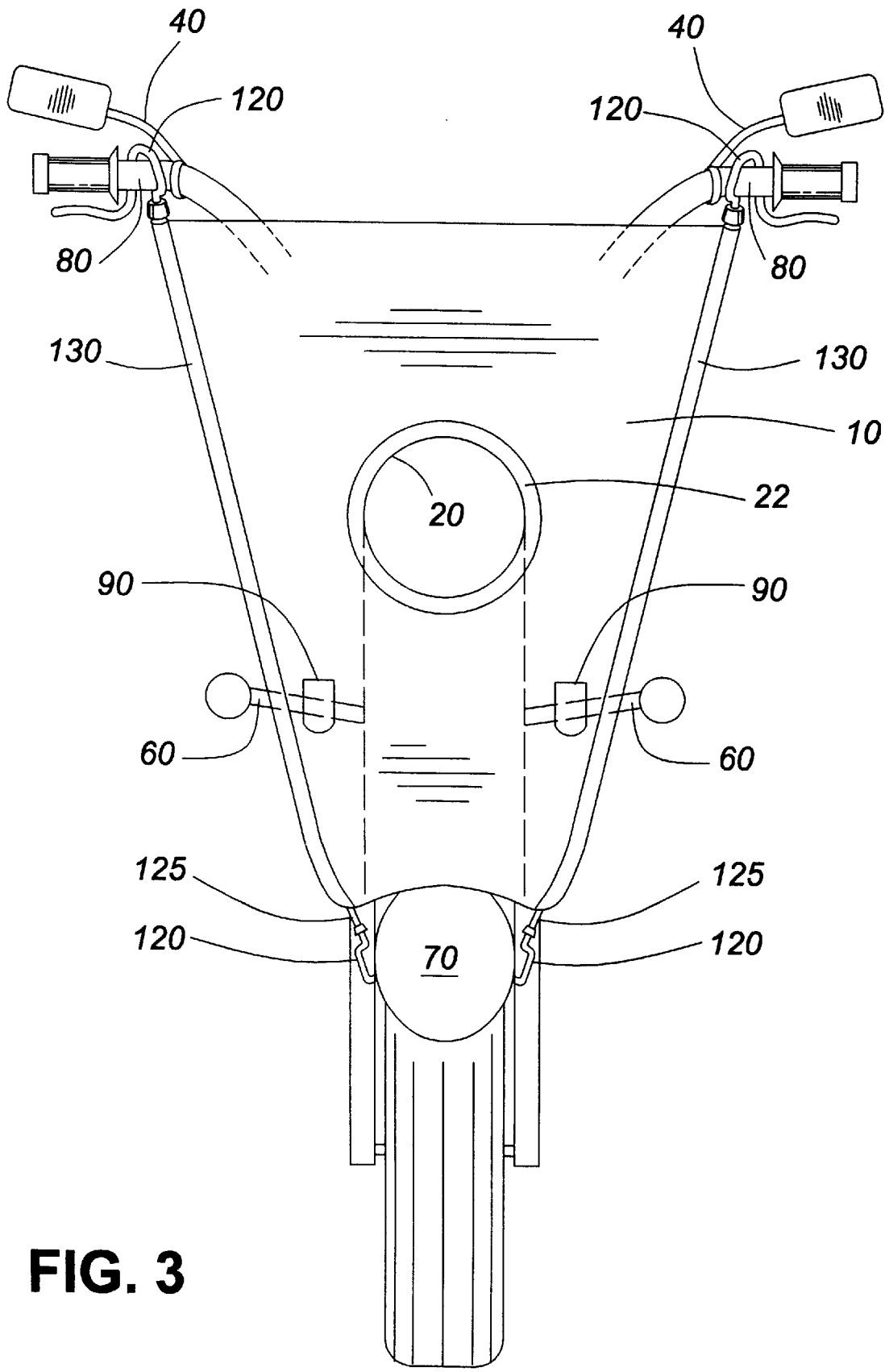
FIG. 3 shows a perspective view of a further embodiment of the removable shield deployed on a motorcycle.

Having regard to FIGS. 1 to 3, a removable shield (10) is shown installed on a motorcycle. However, it is to be understood that the shield of the present invention may also be installed onto a bicycle. FIG. 2 illustrates an embodiment of a removable shield according to the invention, which is not installed on a vehicle.

The removable shield (10) covers the front of the motorcycle or bicycle, from the front fender (70) or front fork region (30) upward to the handlebar region, generally shown as (80). The shield is installed so that it fits outside, and along the bottom edge, of a windshield (50), if present. If a front fender is not attached to the vehicle, for example a bicycle, then the removable shield may extend from the lower front fork region, generally shown as (30) up to the handlebar region (80). At the upper end, the shield is adapted for attachment to the handlebar (80), or rear view mirror stems (40) which extend from handlebars, however, other suitable locations may also be used as needed within the handlebar region. At the lower end, the shield is adapted for attachment to the rim of the front fender (70), or lower front fork assembly (30).

The removable shield optionally provides an opening through which a headlight of a motorcycle may fit (20). This opening may be banded by elastomeric material (22) or the like, in order to ensure a good fit and seal around the headlight. Furthermore, the removable shield may be adapted to attach to the front turning signal stems (60) or other items that are attached to the front of the vehicle in order to further secure the removable shield to the vehicle. For example, which is not to be considered limiting in any manner, on a bicycle the removable shield may also be attached to the front brake assembly.

The attachment means preferably comprise elastomeric material or cords, such as, but not limited to, bungie cords (125) and the like, having appropriately sized clamp means, such as hooks (120), affixed to the ends thereof. Other attachment means may also be employed and include, but are not limited to, rubberized cords or lengths of rubber having clamp means such as hooks or other fasteners attached thereto, lengths of material comprising fastening materials such as hook and loop fasteners (e.g. Velcro®) or the like, springs, clips, grommets (110) etc., as shown in FIG. 2. Furthermore, clamp means attached to the handlebars, fender, forks, turning signal stems or elsewhere, and adapted for attachment to the elastomeric or material fasteners (Velcro®, springs, clips, grommets, etc.) of the removable shield, may also be used.

According to an embodiment of an aspect of the present invention, an elastomeric cord (125), or the like as defined above, may extend through a casing formed along the upper edge of the flexible material, and another elastomeric cord, or the like, as defined above, may extend through a casing formed along the lower edge of the flexible material. The ends of the elastomeric cords which extend through the casings have hooks, or other suitable clamp means as defined above, affixed thereto which may fasten to the outer handlebar region, and sides of the front fender, respectively.

It is also contemplated that the removable shield may comprise elastomeric cords (125, see FIG. 3), or the like, as defined above, extending through a casing (130) formed along the edges of the flexible material that extend from the upper (handlebar) down to the lower (fender/fork) portions of the flexible material, as shown in FIG. 3. These elastomeric cords would be adapted to attach to the handlebar region and fender or fork region with appropriate clamp means as required. It is contemplated that this method of attachment is suitable for securing the removable shield of the present invention to a bicycle lacking a fender. Furthermore, when attached to a vehicle lacking a front fender, the removable shield of the present invention would be appropriately configured so as to be free of the front tire.

It is also considered within the scope of the present invention that the removable shield may comprise no elastomeric cords, or the like, that run the length of any edge, but, that elastomeric cords or other fastener, are secured to the shield at desired locations in order to provide suitable attachment points between the shield and the front of the vehicle.

In any of the methods used to secure the removable shield to the front of the vehicle, care should be exercised in order that the shield is tightly positioned, and well secured to the attachment points in order to provide a semi-rigid surface and effectively deflect road debris, stones, water wind and the like.

To secure the removable shield in place at the upper end, the upper hooks of the elastomeric cord, or other fastening device may latch onto the rear view mirror stems (40). In one embodiment, the elastomeric cords are of a suitable length, for example, which is not to be considered limiting in any manner, of about 24 inches in length and the hooks at each end are metal hooks reinforced with a heavy plastic coating. However, other methods of attachment are also envisioned. These include the use of clamps adapted to secure to the handlebar and to provide a means of attaching the elastomeric cord of the removable shield to the handlebar. Such means may include the use of Velcro® (hook and loop) fasteners and the like, grommets, springs, or other suitable clips. To secure the shield in place at the lower end, clamp means such as hooks, or other fastening devices at the lower end of the elastomeric cord, attach to the rim of the front fender, or to a clamp means itself attached to the rim of the front fender, on opposing sides. Again, the clamp means may include the use of Velcro® (hook and loop) fasteners and the like, grommets, springs, or other suitable clips. Furthermore, in order to adequately fasten the lower portion of the shield to a fenderless vehicle, such as a bicycle, hooks, grommets, or other fastening devices mentioned above that are attached to elastomeric cord, or to the shield itself, may be used to secure the shield to the lower ends of the front forks, to the outer axel of the front wheel, or to clamp means attached to the front forks.

To further anchor the shield securely to the motorcycle or bicycle, anchoring straps (90) may be used to attach the shield on the left and right sides to the front turning signal stems (60). Expediently, hook and loop closure straps (100) see FIG. 2, such as Velcro® straps, could be used to secure the removable shield of the present invention to the turning signal stems (60), thereby preventing the shield from flapping in the wind. Any suitable closure, such as buckles, snaps, etc. may be employed to secure the anchoring straps (90) to an attachment point on the motorcycle or bicycle. It is also contemplated that other attachment points may be used as required. The anchoring straps may extend from the edges of the removable shield, or be located on the back-facing side of the shield. Similarly, other means of attachment may be employed including, but not limited to, clamps adapted to secure to the turning signal stem and provide a means for attaching the edge or back of the removable shield to the signal stem. For example, clamps comprising pins adapted to snap within a grommet may be fastened to the turning signal stem, and a suitable located opening and grommet (110) provided within the removable shield in order to matingly accept the pin.

The removable shield of the present invention optionally provides for an aperture (20) which fits closely around the headlight of a motorcycle so that the shield does not block the light emanating from the headlight. Expediently, the aperture is provided with an elasticized perimeter, thereby securely positioning the covering around the headlight. To ensure a close fit of the elasticized aperture around the headlight, a hook and loop closure, such as a Velcro® closure may be employed in combination with the elasticized perimeter of the aperture. However, any other suitable fastening means may also be used. Preferably, the elasticized portion comprises an elastic band of approximately 3 inches in width.

The removable shield is flexible and lightweight. The flexible material may be a heavy gauge nylon material or other similar material of adequate flexibility and strength, such as vinyl, plastic, leather, etc. The shield is easily installed and removed from the front of a motorcycle, and upon removal, the shield can be folded up and placed within a saddle bag or in any other convenient location. The removable shield is preferably sleek and attractive, which encourages the owner of a vehicle to use the device, since it does not interfere with aesthetic appeal, nor the mounting or dismounting of the vehicle. The removable shield of the present invention may be manufactured to custom-fit particular motorcycles or bicycles, or may be made to adaptably fit various sizes of motorcycles and bicycles. During use the shield of the present invention affords protection to the rider of the vehicle from wind, water, stones and other debris, and if used in conjunction with a windshield provides full protection from the lower leg, through to mid region, hands and upper body of the rider.

The present invention has been described with regard to prefered embodiments. However, it will be obvious to persons skilled in the art that a number of variations and modifications can be made without departing from the scope of the invention as described herein.

What is claimed is:

1. A removable shield for deflecting wind and projectile objects from the front of a motorcycle, said shield comprising:
   a flexible material sized to cover a portion of the front of said motorcycle between a handlebar and a front fender, said flexible material having two casings formed along opposing edges of said flexible material, respectively; said flexible material having an aperture for a headlight; and
   attachment means extending from said flexible material for securing said shield to the front of said motorcycle, the attachment means comprising:
      two elastomeric cords, each extending through one of said casings formed along opposing edges of said flexible material;
      and clamp means disposed at terminal ends of each elastomeric cord for reversibly affixing said shield to said handlebar and said front fender of the motorcycle.

2. The removable shield according to claim 1, additionally comprising anchoring straps extending from said flexible material positioned to attach to the front turning signal stems of said motorcycle.

3. The removable shield of claim 2, wherein the anchoring straps comprise hook and loop fasteners.

4. The removable shield of claim 1, wherein said attachment means secure said shield to said handlebar and to the front forks of said motorcycle.

5. The removable shield according to claim 4, wherein the vehicle is a bicycle.

6. The removable shield of claim 1, wherein said attachment means secure said shield to the rear view mirror stems of said handlebar.

7. The removable shield of claim 1, wherein the attachment means further comprises at least one clamp means adapted for attachment to said handlebar, said front fender, front fork, or other item on the front of said vehicle, or a combination thereof; said at least one clamp means adapted for attachment to said at least one elastomeric cord.

8. The removable shield according to claim 7, wherein said at least one clamp means provides attachment between said shield and the front of said vehicle in a position located between said handlebar and front fender or front fork.

9. The removable shield of claim 1, wherein said aperture comprises an elasticized perimeter adapted to fit around said headlight.

10. The removable shield according to claim 9, wherein said elasticized perimeter additionally comprises a hook and loop fastener closure for adjusting the fit of said aperture around said headlight.

11. The removable shield of claim 1, wherein the flexible material is selected from the group comprising nylon, vinyl, plastic and leather.

* * * * *